United States Patent [19]

Pálfalvi et al.

[11] Patent Number: 4,909,309

[45] Date of Patent: Mar. 20, 1990

[54] AIR CONDENSER INSTALLATION

[75] Inventors: György Pálfalvi; János Bódás; István Papp, all of Budapest, Hungary

[73] Assignee: Energiagazdálkodási Intézet, Budapest, Hungary

[21] Appl. No.: 332,830

[22] Filed: Apr. 3, 1989

[51] Int. Cl.⁴ .................. B60H 1/00; B61D 27/00; F28B 1/00

[52] U.S. Cl. ..................... 165/39; 165/110; 165/111; 165/108; 165/900

[58] Field of Search .............. 165/39, 111, 110, 900, 165/108; 60/686

[56] References Cited

U.S. PATENT DOCUMENTS

| | | | |
|---|---|---|---|
| 1,742,449 | 1/1930 | Page et al. | 165/39 |
| 3,289,742 | 12/1966 | Niemann | 165/111 |
| 3,384,165 | 5/1968 | Mathews | 165/39 |
| 3,556,204 | 1/1971 | Dehne | 165/31 |
| 3,565,164 | 2/1971 | Kline | 165/39 |
| 3,716,097 | 2/1973 | Kelp et al. | 165/39 |
| 4,450,899 | 5/1984 | Jakobsson et al. | 165/900 |

Primary Examiner—John Ford
Attorney, Agent, or Firm—Jordan and Hamburg

[57] ABSTRACT

Air condensers are liable to suffer from undercooling which may entail frost damages and represents, in any case, thermo-dynamic losses. In order to prevent undercooling the working length (X) of the cooling surfaces of the air condensers (10) are controlled by shutters (28) which are associated with a drive mechanism (30) operated dependent on the temperature difference of condensates withdrawing from a first and a further row of tubes (18, 20) of the air condensers. By shutters (46) located in a gap (44) between the air condensers (10) the cooling air is enabled to recirculate whereby danger of frost and undesired risings of the temperature level of condensation may be avoided and impeded, respectively. A casing (68) encompassing the air condensers (10) and provided with shutters (64, 66) at its bottom and top permits starting without danger of frost likewise by means of recirculation. (FIG. 2)

6 Claims, 3 Drawing Sheets

AIR CONDENSER INSTALLATION

FIELD OF INVENTION

This invention relates to air condenser installations for condensing steam, more particularly, exhaust steam of power station steam turbines.

BACKGROUND OF INVENTION

Air condenser installations are composed of air condensers in which steam is condensed by fan supplied air. The air condensers consist of inclined or upright finned cooling tubes connected, at their upper ends, to a common steam distribution chamber or manifold and, at their lower ends, to a common condensate collecting chamber or collection header. The inclined or upright position of the cooling tubes ensures that the condensate of the steam reaches the collecting chamber by means of gravity.

In operation, the exhaust steam introduced from the steam distribution chamber into the cooling tubes becomes, while flowing, condensed at constant temperature. Resulting liquid drops form a liquid film flowing downwards on the inner walls of the cooling tubes. The temperature of the liquid film is substantially equal to the temperature of the incoming exhaust steam.

If the length of the cooling tubes is such that condensation is terminated just at the end of the cooling tubes, the temperature of the condensate withdrawing into the collecting chamber is substantially likewise equal to the temperature of the entering exhaust steam.

If, on the other hand, due to changes of operational factors such as load, temperature of cooling air and the like, the length of the cooling tubes becomes smaller than the previously specified value, condensation of the exhaust steam will not be finished within the cooling tubes which, then, discharge steam as well. This amount of steam which is assessed to 20 percent of the total steam flow, is condensed in a secondary condensation zone. Structure of the air condensers of the secondary condensation zone is the same as that of the already described primary condensation zone. However, an operational difference consists in that the steam flows, for reasons irrelevant here, as a rule, in upward direction in their cooling tubes.

Should the length of the cooling tubes surpass the above mentioned value, condensation will be terminated before the condensate reaches the collecting chamber. Then, the liquid film flowing downwards on the inner walls of the cooling tubes is further cooled down so that, dependent on the tube length, considerable differences between the temperatures of the entering exhaust steam and the exiting condensate may appear: the condensate becomes undercooled.

Undercooling of the condensate is undesirable for two reasons.

On the one hand, it represents thermodynamical loss because the undercooled condensate can be reevaporated but by combusting surplus fuel which could be spared if there were no undercooling.

On the other hand, undercooling may provoke danger of frost since the undercooled condensate may freeze at low ambient temperatures and entail frost damages in the air condensers of the installation.

PRIOR ART

Various expedients have been suggested to avoid the problem of freezing of the condensate in the cooling tubes of the air condensers of air condenser installations.

The most simple means to prevent undercooling consists in permitting but partial condensation in the cooling tubes. Thereby, it is ensured that also steam is discharged as disclosed, for instance, in U.S. Pat. No. 3,705,621. Obviously, the capacity of the air condensers of the installation is, then, not fully exploited.

Where in the cooling tubes of the row first impinged by the cooling air, full condensation is employed, danger of freezing is prevented by measuring the temperature of the condensate withdrawing from such row. If the temperature is lower than a preselected value, cooling is moderated by diminishing the flow of cooling air by means of modifying the fan performance. Here, then, undercooling and, thereby, freezing is prevented by adjusting the performance of the fans supplying the cooling air which is uneconomic as will be clear to those skilled in the art. Such air condenser is described in U.S. Pat. No. 4,177,859.

Adjusting by means of fan performance may be avoided by baffling and recirculating the air flow rather than by diminishing it. For such purpose curtains suitable to screen the air condensers to variable extents dependent on the temperatures of the condensate, the ambiency and the entering steam are employed. Due to recirculation the cooling tubes of the first row are swept by relatively warmer air whereby the danger of freezing is prevented. Such air condenser installation is described in U.S. Pat. No. 4,450,899.

A similar expedient for avoiding the problems of freezing by means of baffling rather than by regulating the fan performance is also represented by an air condenser installation in which baffling is effected by covering flaps of variable length arranged before and after the cooling tubes rather than by curtains. The flaps are adjusted dependent on the temperature of the condensate and, possibly, of the ambiency as, for instance, in case of the air condenser installation described in DE 19 62 061.

In a similar solution the air condensers are located in an air box while the exterior walls and partitions of the air boxes comprise shutters suitable to baffle and recirculate the cooling air. Such installation is disclosed in CH 485 187.

As will be seen, the prior art offers a number of expedients to avoid freezing problems by which also undercooling may be prevented should it appear at temperature levels liable to evoke the danger of freezing.

However, it has been seen that undercooling may also appear at temperature levels and ambient temperatures at which freezing problems are out of question, for instance in cases where the temperature of the incoming cooling air is well above freezing point. Obviously, even such undercooling is undesirable because of the above mentioned thermodynamic loss.

OBJECTS OF THE INVENTION

The main object of the present invention is to prevent undercooling irrespective of the danger of frost and, thereby, to ensure maximum thermodynamic efficiency of air condensers with cooling tubes in multi-row arrangement. The invention is based on the perception that differences in the performances of air condensers working in parallel in an air condenser installation are responsible for undercooling, Viz., in case of performance differences some of the air condensers are overloaded while others work at diminished load. Thus, with some air condensers cooling has to be increased while with others it has to be reduced. The former discharge steam until cooling is increased. In the latter the condensate undercools until cooling is reduced.

Thus, undercooling is prone to be prevented by eliminating any performance differences that is by equalizing the cooling performances of air condensers working in parallel. However, for such purpose the known methods for preventing frost damages are unsuitable. Namely, where a control signal is derived from the temperature of the condensate withdrawing from the first row of tubes, such temperature ought to be compared with the inlet temperature of the steam rather than with the freezing point. On the other hand, where the temperature of the condensate in the collecting chamber is decisive, it does not permit to infer possible undercooling in the first row of tubes since the fresh air reaching the first row of tubes warms up in the course of condensing the steam so that the second and further tube rows are impinged by ever warmer air. Thus, the collecting chamber receives condensates of different temperatures and even steam. The intermixing condensates yield a mean temperature which, though lower than the inlet temperature of steam, is still higher than the temperature of the condensate withdrawing from the first row of tubes.

Thus, to enable observation of undercooling independent of frost danger a method has to be devised which is based on operational factors prior to reaching the collecting chamber.

A comparison of the temperature of the condensate withdrawing from individual rows of tubes with the inlet temperature of steam seems to be such method. However, it is known that to measure the temperature of steam probably on basis of pressure measuring is a cumbersome job by which, in case of air condenser installations composed of several air condensers consisting each of a plurality of tube rows, investment costs would undesirably be raised and a number of causes for possible operational troubles would be ventured.

The nature of the solution proposed by the invention is entirely foreign to the prior art. It is based on the perception that the presence of undercooling can be proved also by comparing the temperatures of condensates withdrawing from the first and a further row of tubes, preferably from the first and second ones, that is by means of measuring mere liquid temperatures. Viz., when the air condenser installation works at preselected operational conditions (steam load, temperature of cooling air and the like), the first row of tubes will discharge a condensate the temperature of which is equal to the temperature of the entering steam so that no undercooling will be present. The second row of tubes may yield steam as well since the temperature of the cooling air sweeping the tubes of the first row is raised. Thus, there is no difference between the temperatures of the condensates withdrawing from the first and further tube rows: the air condensers of the air condenser installation operate at the same load.

If the steam load and, thereby, the temperature of the entering steam diminishes, condensation takes place at a temperature lower than previously yet likewise without undercooling. Each of the tube rows discharges condensates of unifiorm temperature.

However, the situation changes whenever the load distribution between the operating units (the air condensers) becomes unequal, that is an asymmetry appears between the cooling performances of the air condensers: the cooling performance of one or another air condenser increases or decreases for some reason. Such assymmetry may be due, for instance, to a difference in the fan performances entailed intentionally or unintentionally. Then, in some of the air condensers, undercooling necessarily appears. Due to undercooling the temperatures of the condensates withdrawing from the tube rows differ from one another and it is such temperature difference which, in compliance with the basic idea of the present invention, is exploited for eliminating performance differences of the air condensers or, in other words, equalizing their outputs.

Equalizing the air condenser performances is ensured by changing the operational length of the cooling surfaces of the air condensers by means of adjustable screens until the prescribed value of the cooling performance is reestablished.

In order to ascertain the temperature difference temperature signals are taken from the condensates withdrawing from the first row of tubes and from the condensate withdrawing from a further row of tubes, preferably from the second one. These temperature signals are supplied into a comparator the output signal of which triggers a drive mechanism which, in turn, adjusts the position of the screens.

SUMMARY OF THE INVENTION

Thus, the present invention represents an improvement of air condenser installations for condensing steam, more particularly exhaust steam of power station steam turbines, comprising, in a manner known per se, air condensers having cooling tubes arranged in at least two rows one after the other in the flow direction of cooling air, and associated with screens suitable to adjust the working length of their cooling surfaces. In compliance with the main feature of the invention the air condensers are provided with means for adjusting the position of the screens dependent on the temperature difference of condensates withdrawing from the first and a further row of cooling tubes, preferably from the first and second ones.

As has been mentioned, the air condenser installation with screens according to the invention operates, independent of the temperature of cooling air, without undercooling until the cooling performances of the air condensers show no asymmetry. In case of asymmetry, on the other hand, the working length of the cooling surfaces of the air condenser responsible for asymmetry is, by means of the screens, changed until the cooling performances of the air condensers of the installation become again equalized.

With equalized or uniform cooling performances a preselected difference between the temperatures of the entering steam and the cooling air remains unchanged during operation of the installation. If the temperature of the cooling air decreases the aforesaid temperature difference will appear at ever lower levels. Yet, there will be no undercooling.

However, with diminishing cooling air temperature the temperature level of condensation may approach the freezing point. This may bring about the danger of frost since the condensate in the first row of tubes may become undercooled by the cold ambiency and freeze in the tubes.

On the other hand, the temperature of condensation may undesirably increase because of warming up of the cooling air so that it will not correspond to the operational requirements of the steam turbine of the power station any more.

The air condenser installation according to the invention permits to automatically prevent both anomalies by adjusting the temperature level of condensation. Namely, regulation of the latter requires but the provision of shutters between pairs of adjacent air condensers by which a portion of the warmed up cooling air is recirculated into the incoming air flow. The position of the shutters will be adjusted dependent on the temperature of the entering steam.

As will be apparent, such means interfere with the control of the means for preventing the undercooling by maintaining the temperature difference between the entering steam and the cooling air without, however, determining its level.

The shutters between the air condensers prevent, by baffling the air flow, both a sinking of the temperature level to values liable to evoke danger of frost and a rising thereof to undesirable figures.

The shutters are adjusted by means of a drive mechanism which is triggered by the output signal of a comparator receiving a temperature signal derived from the temperature of the incoming steam. In the comparator such signal is compared with a set threshold value whereupon an output signal is given dependent on the result of comparison.

Thus, in order to set the temperature level the air condenser installation according to the invention is provided with adjustable shutters for closing a gap between pairs of oppositely arranged air condensers dependent on the temperature of incoming steam by which a portion of the cooling air warmed up in the condensers is recirculated. Thereby, undesired sinking of the temperature level of condensation is reliably prevented. By increasing the inflow of fresh air undesired risings of the temperature level are likewise impeded.

In addition to undercooling and undesired sinking or rising of the temperature level difficulties may also be encountered at starting the air condenser installation at excessively low ambient temperatures. Viz., the incoming steam may be condensed and even frozen by the cold metal masses of the installation such as finned cooling tubes and the like independent of the flow of cooling air and its cooling effect.

With the invention such difficulties may likewise be simply eliminated by arranging the air condensers, in a manner known per se, in an air box which is complemented to a casing by lower and upper shutters suitable to close the casing towards the ambiency and to recirculate the cooling air therein dependent on ambient temperature. The shutters are operated by a drive mechanism which, in turn, is controlled by the output signal of a comparator comparing the ambient temperature with an adjustable threshold value and deriving the output signal from the difference of the compared values.

At extremely low ambient temperatures the shutters are kept closed until the temperature of cooling air circulating in closed system reaches the threshold value set in the comparator. It means that the cold metal masses of the air condensers do not interfere with the course of cooling any more. Thus, cooling at a controlled temperature level with no undercooling may start and normal operation of the installation be initiated by opening the shutters.

The air condenser installation according to the invention may also be complemented with hand-operated adjusting means for setting the threshold values in the above mentioned comparators or the like.

BRIEF DESCRIPTION OF THE DRAWING

Hereinafter the invention will be described in closer details by taking reference to the drawing which shows, by way of example, preferred embodiments of the invention and in which.

Same reference characters designate similar details throughout the drawing.

DESCRIPTION OF PREFERRED EMBODIMENTS

As shown, the air condenser installation according to the invention comprises pairwise oppositely arranged air condensers 10 which, in upright longutudinal sectional views, occupy positions in the form of a V with its tip pointing downwards.

Figure 1:
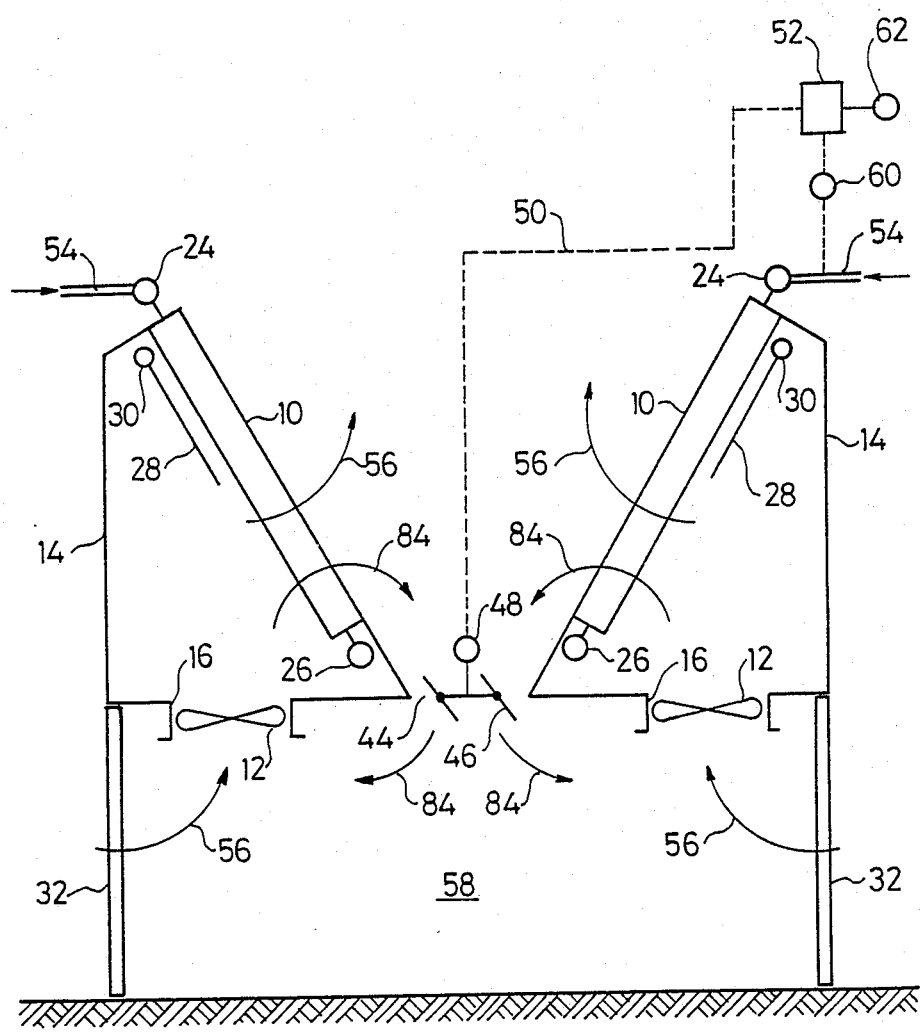
FIG. 1 is an upright longitudinal sectional view of an exemplified embodiment.
Figure 2:
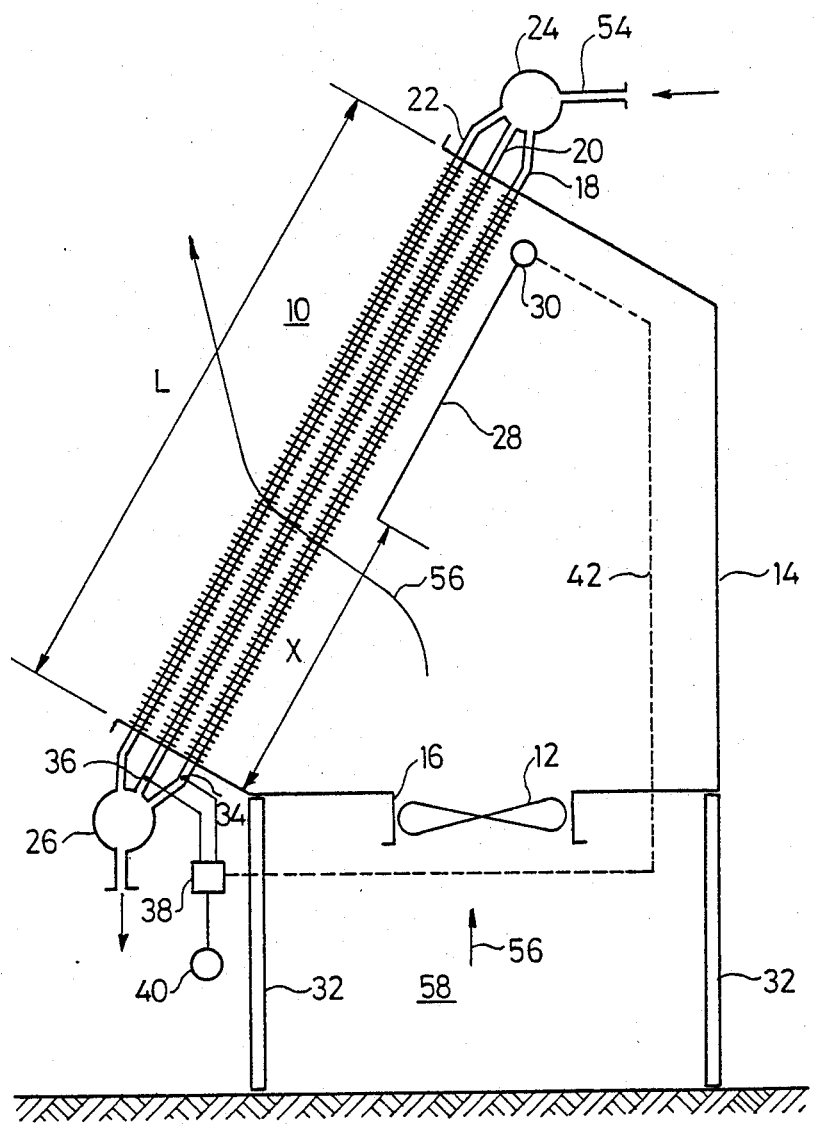
FIG. 2 shows a detail of FIG. 1 at an enlarged scale.

With the exemplified embodiment illustrated in FIGS. 1 and 2 each of the air condensers 10 is associated with a fan 12 placed in a bottom aperture 16 of an air box 14. In upward direction the air boxes 14 are closed by the air condensers 10.

As illustrated in FIG. 2, each air condenser 10 comprises cooling tubes 18, 20, 22 which are, in the instant case, arranged in three rows one after the other, and connected, above, to a steam distribution chamber 24 and, below, to a collecting chamber 26. Obviously, more than three rows of cooling tubes could be employed if necessary. It will be apparent, however, that at least two such rows are needed to carry out the invention.

The working length of the cooling tubes 18, 20, 22 is set by a screen or curtain 28 which is, viewed from the fan 12, located before the first row of tubes 18. Screen 28 is adjusted by a drive mechanism 30.

Reference character 32 designates legs which support the air condensers 10 by means of the air boxes 14.

As has been mentioned, undercooling is, in compliance with the invention, prevented at any temperature level by measuring the difference between the temperatures of the condensates withdrawing from the first and a further row of tubes and by changing the working length of the cooling surfaces of the tubes dependent on such difference.

With the represented embodiment shown in FIGS. 1 and 2 the temperature difference of the condensates withdrawing from the rows of cooling tubes 18 and 20 is measured since, then, there is greater chance to measure the temperatures of liquid media which is, as has been hinted at, a relatively simple job. For such purpose thermometers 34 and 36 are inserted into the final sections of the cooling tubes 18 and 20, respectively, where they protrude from the air condenser 10 (FIG. 2). Thus, temperature signals will be derived from the condensates before they reach the condensate collecting chambers 26.

The signals of the thermometers 34 and 36 are supplied into a comparator 38 which forms the difference value of the signals. If such value is greater than a threshold value set in the comparator 38 by a hand-operated regulator 40, the comparator 38 gives an output signal through a line 42 to a drive mechanism 30 which operates the screen 28 until the surplus value disappears.

As has been mentioned, together with eliminating an undercooling also the temperature level suitable to prevent a danger of frost may be ensured. This is obtained by means of shutters provided between pairs of air condensers and controlled dependent on the temperature of inflowing steam.

Such solution is represented in FIG. 1 where shutters 46 are provided in a gap 44 which separates a pair of mutually opposite air condensers 10 at the tip of the already mentioned V-form. A drive mechanism 48 adjusting the shutters 46 is connected by a line 50 to a comparator 52 which receives a temperature signal from a thermometer 60 sensing the temperature of exhaust steam flowing in conduit 54. Such temperature is compared in the comparator 52 with a a pair of threshold values adjusted manually by a regulator 62. Dependent on the result of comparison the drive mechanism 48 is triggered to close or open the shutters as the case may be.

The air condenser installation shown in FIGS. 1 and 2 operates as follows:

Be assumed that the working surface of the cooler tubes ensures complete condensation without undercooling if the temperature of the entering steam is 50 degrees centigrade and the temperature of cooling air sucked in from the ambiency amounts to 20 degrees centigrade.

Thus, the exhaust steam of a power station steam turbine, not shown, arrives through conduit 54 into the distribution chamber 24 and from here into the cooler tubes 18, 20, 22 of the air condensers 10 at a temperature of 50 degrees centigrade.

The fans 12 supply cooling air from the ambiency 58 in the direction indicated by arrows 56 at a temperature of 20 degrees centigrade. The cooling air first impinges on cooler tubes 18 (the "first" row of tubes) whereafter it sweeps cooler tubes 20 and 22 in succession and becomes more and more warmed up (FIG. 2).

Since there is no undercooling, the cooler tubes 18, 20, 22 discharge condensates and steam, respectively, the temperature of which is, substantially, the same as that of the entering steam (50 degrees centigrade). However, prior to reaching the collecting chambers 26 the temperatures of the media withdrawing from the cooler tubes 18 and 20 are measured by the thermometers 34 and 36, respectively, and their temperature signals are supplied into the comparator 38.

If the difference between these temperature signals is less than the threshold value adjusted by the manual regulator 40, substantially there is no undercooling.

If, on the other hand, the difference is greater than the established threshold value, the respective air condenser 10 works at undercooling in consequence of which the first row of tubes 18 yields a condensate of e.g. 45 degrees centigrade, and the second row of tubes 20 discharges a condensate of e.g. 49 degrees centigrade.

In order to stop undercooling the comparator 38 gives an output signal which reaches through line 42 the drive mechanism 30 and causes it to move the screen 28 in the direction of closing. Consequently, the working surface of the cooler tubes and, thereby, the cooling performance of the condenser decreases so that also the undercooling diminishes. Adjusting of the screen 28 lasts until undercooling ceases, that is the temperature difference between the condensates withdrawing from the first and second rows of tubes disappears.

As has been mentioned, by suitably adjusting the temperature level of condensation it is also possible, in addition to prevent danger of frost, to obtain an adaptation to the working conditions of the steam turbine of the power plant. For such purpose, the comparator 52 of the drive mechanism 48 adjusting the shutters 46 has two threshold values as has been hinted at. According to which thereof is exceeded, the drive mechanism 48 is operated in the sense of opening or closing the shutters 46 and, thereby, to raise or sink the temperature level.

Figure 3:
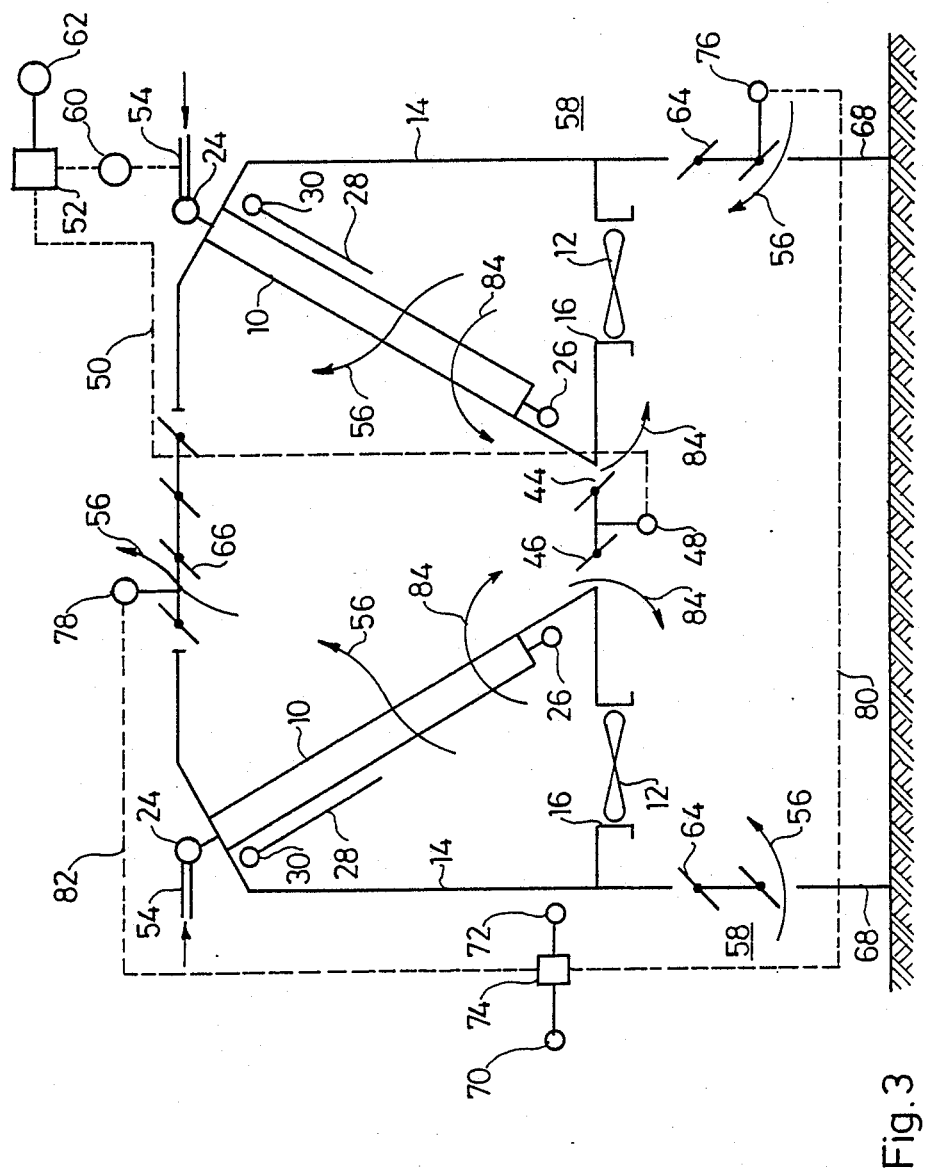
FIG. 3 represents an upright longitudinal sectional view of another exemplified embodiment.

In case of difficulties at starting of the air condenser installation caused by excessively cold ambiency, an embodiment as illustrated in FIG. 3 may be employed.

Here the air boxes 14 are complemented to a common casing 68 encompassing the air condensers 10 and provided with lower shutters 64 and upper shutters 66. The lower shutters 64 admit ambient air to the fans 12 of the air condenser installation. The upper shutters 66, on the other hand, serve for discharging the withdrawing cooling air back into the ambiency. The lower shutters 64 and the upper shutters 66 are both controlled by a comparator 74 connected to a sensor 70 for ascertaining the ambient temperature and adjusted by a hand-operated programming means 72. Output signals of comparator 74 trigger the operation of drive mechanisms 76 and 78 through lines 80 and 82, respectively.

Thus, FIG. 3 shows an exemplified embodiment of the air condenser installation according to the invention which is distinguished, as has been shown, by the provision of a casing 68 encompassing the air condensers 10, of shutters 64 and 66 closing the casing at bottom and top, respectively, and of a comparator 74 operating the shutters dependent on the temperature of the ambiency 58.

If, due to low ambient temperatures, the metal masses of the installation may have a freezing effect, the hand-operated programming means 72 is adjusted so as to cause the drive mechanisms 76 and 78 to shift the shutters 64 and 66, respectively, into their closed positions where the air condensers 10 of the air condenser installation are separated from the ambient 58.

Then, exhaust steam of the power station turbine is permitted to enter the air condensers 10 which, in absence of cooling, warm up. The air, supplied by the fans 12, is recirculated as indicated by arrows 84 and becomes likewise warmed up while it sweeps the warmed up air condensers 10.

When the temperature of the metal masses of the installation reaches the temperature of condensation, comparator 74 causes the shutters 64 and 66 to open whereupon cooling under operational conditions sets in.

Then, screens 28 determining the working length X (FIG. 2) of the cooling surfaces of air condensers 10, and the shutters 46 setting the temperature level of condensation start operating as well. The former will prevent undercooling while the latter preclude danger of frost and impede undue risings of the temperature level.

Thus, the air condenser installation according to the invention has, in normal operation, three regulating systems working in it.

The first thereof serves for preventing undercooling by means of screens 28, drive mechanisms 30, lines 34 and 36, and comparator 38.

The second system is responsible for the temperature level and comprises shutters 46, drive mechanism 48, line 50, comparator 52, thermometer 60 and regulator 62.

Finally, the third system with sensor 70, hand-operated programming means 72, comparator 74, drive mechanisms 76 and 78, and lines 80 and 82 ensures the possibility to start the air condenser installation at extremely cold ambiencies without the danger of frost.

Hereinbefore, the air condenser installation according to the invention was described as having screens and shutters. However, screens and shutters might be replaced by any other closure means suitable to change the length X of the cooling surfaces of the air condensers and the cross-sectional flow areas of cooling air, respectively. Thus, the terms "screen" and "shutters" have been selected to indicate operational functions rather than the actual structure of respective means.

It will be apparent that the solution according to the invention obtains elimination of load distribution asymmetry by taking measurements between the air condensers and the collecting chamber and by changing the length of the air condenser cooling surfaces dependent on the result of such measurements. The most important consequence hereof is that load equalization of the air condensers or, in other words, the load symmetry between units working in parallel is ensured to hitherto unattained degrees. A further significant consequence consists in that the cooling surfaces of the air condensers need not be shut off at their entire length L. Viz., what has to be striven for is maximum flow rate of cooling air since it acts ab ovo against temperature differences between condensates withdrawing from the rows of cooling tubes. Therefore, the working length of the cooling surfaces has to be changed by about 20 to 40 percent only which obviously means savings in investment costs.

The regulating systems were described as comprising comparators. What has been said in connection with screens and shutters, applies to comparators as well: instead of comparators and means suitable to receive control signals and to give output signals dependent on interrelated values may be employed.

It will be apparent that the air condenser installation according to the invention is suitable, in addition to condense the exhaust steam of power station steam turbines, also to condense steam of any other origin as will be clear to the skilled art worker. Thus, it is suitable to satisfy condensation requirements especially of chemical plants as well.

We claim:

1. An air condenser installation for condensing steam, more particularly the exhaust steam of power station steam turbines, comprising air condensers having cooling tubes arranged in at least two rows one after the other in the flow direction of cooling air, and associated with screens suitable to adjust the working length of their cooling surfaces, characterized in that the air condensers (10) are provided with means (30, 34, 36, 38, 40, 42) for adjusting the position of the screens (28) dependent on the temperature difference of condensates withdrawing from the first and a further row of cooling tubes, preferably from the first and second ones (18 and 20, respectively).

2. Air condenser installation as claimed in claim 1, characterized by the provision of adjustable shutters (46) for closing a gap (44) between pairs of oppositely arranged air condensers (10) for recirculating a portion of warmed up cooling air dependent on the temperature of incoming steam.

3. Air condenser installation as claimed in claim 1, characterized in that each of the air condensers (10) is arranged in an air box formed as a unit with a casing (68), the unit having lower and upper shutters (64 and 66, respectively) suitable to close the casing from the ambient (58) and to recirculate the cooling air therein dependent on ambient temperature.

4. Air condenser installation as claimed in claim 1, characterized by hand-operated adjusting means (40) for said screen position adjusting means.

5. Air condenser installation as claimed in claim 2, characterized by hand-operated adjusting means (62) for said adjustable shutters (46).

6. Air conditioner installation as claimed in claim 3, characterized by hand-operated adjusting means (72) for said lower and upper shutters (64, 66).

* * * * *